United States Patent [19]
Itoh et al.

[11] 3,942,097
[45] Mar. 2, 1976

[54] VOLTAGE REGULATING SYSTEM

[75] Inventors: Katsumi Itoh, Ohbu; Kazumasa Mori, Aichi both of Japan

[73] Assignee: Nippondenso Co., Ltd., Kariya, Japan

[22] Filed: Oct. 16, 1974

[21] Appl. No.: 515,246

[30] Foreign Application Priority Data
Oct. 22, 1973 Japan............................. 48-119335
May 6, 1974 Japan............................. 49-50852

[52] U.S. Cl. ...................... 322/28; 320/64; 322/99; 317/33 VR
[51] Int. Cl.² ........................................ H02J 7/14
[58] Field of Search ............ 322/28, 99; 320/48, 64; 317/33 VR

[56] References Cited
UNITED STATES PATENTS

| | | | |
|---|---|---|---|
| 3,469,168 | 9/1969 | Harland et al. ....................... | 320/64 |
| 3,656,135 | 4/1972 | Ruff ................................ | 320/48 UX |
| 3,764,879 | 10/1973 | Hill .................................. | 322/99 X |
| 3,781,633 | 12/1973 | Iwaki et al. ........................ | 322/99 X |

*Primary Examiner*—J. D. Miller
*Assistant Examiner*—Robert J. Hickey
*Attorney, Agent, or Firm*—Cushman, Darby & Cushman

[57] ABSTRACT

In a voltage regulating system, a transistor switching circuit is connected to a voltage sensing circuit which detects a battery voltage and to a lamp. And at least when the voltage sensing circuit becomes disconnected from the battery, the transistor switching circuit is switched on to energize the lamp to inform a driver of the disconnection.

6 Claims, 6 Drawing Figures

VOLTAGE REGULATING SYSTEM

BACKGROUND OF THE INVENTION

1. FIELD OF THE INVENTION

The present invention relates to a voltage regulating system for voltage regulators installed in automotive vehicles, and more particularly relates to a system which is capable of regulating output voltage of a battery charging generator even when the generator and a battery becomes disconnected and when the normal voltage sensing circuit of the voltage regulator becomes disconnected from the generator and the battery, and further capable of indicating the disconnection in the system.

2. DESCRIPTION OF THE PRIOR ART

A conventional well-known voltage regulator of this kind is provided with an output transistor for controlling field current flowing through a field winding of a battery charging generator, a voltage sensing circuit for sensing the voltage of the battery and a transistor circuit including a control transistor effected by the voltage sensing circuit and controlling the output transistor. The field winding is supplied with current by three auxiliary diodes connected to the battery charging generator. The voltage sensing circuit is connected across the battery, which is connected to a power bridge rectifier of the generator by means of a power supply cable.

However in this conventional voltage regulator, if the positive terminal of the power bridge rectifier or the voltage sensing circuit becomes disconnected, the output transistor of the voltage regulator is continuously biased conductive to thereby result in uncontrolled high voltage which would destroy electrical components of the system. And another disadvantage resides in that this conventional system has no means to inform a driver of the disconnection causing uncontrolled high voltage.

SUMMARY OF THE INVENTION

It is therefore a primary object of the present invention to provide a voltage regulating system which can control output voltage of a battery charging generator even when the voltage regulator becomes disconnected from a battery.

Another object of the present invention is to provide a voltage regulating system which can inform a driver of abnormal condition such as disconnection in the system.

The novel features which are considered characteristic of the present invention are set forth with particularity in the appended claims. The invention itself, however, and additional objects and advantages thereof will best be understood from the following description of embodiments thereof when read in connection with the accompanying drawings, in which:

FIG. 1 is an electric circuit diagram showing a first embodiment of the present invention, FIG. 2 is an electric circuit diagram of a second embodiment, FIG. 3 is an electric circuit diagram of a third embodiment, FIG. 4 is an electric circuit diagram of a fourth embodiment, FIG. 5 is an electric circuit diagram showing modified connection of an indicating lamp in FIG. 3 or FIG. 4, and FIG. 6 is an electric circuit diagram showing further modified connection of the indicating lamp in FIG. 3 or FIG. 4.

DESCRIPTION OF THE PREFERRED EMBODIMENTS

Figure 1:
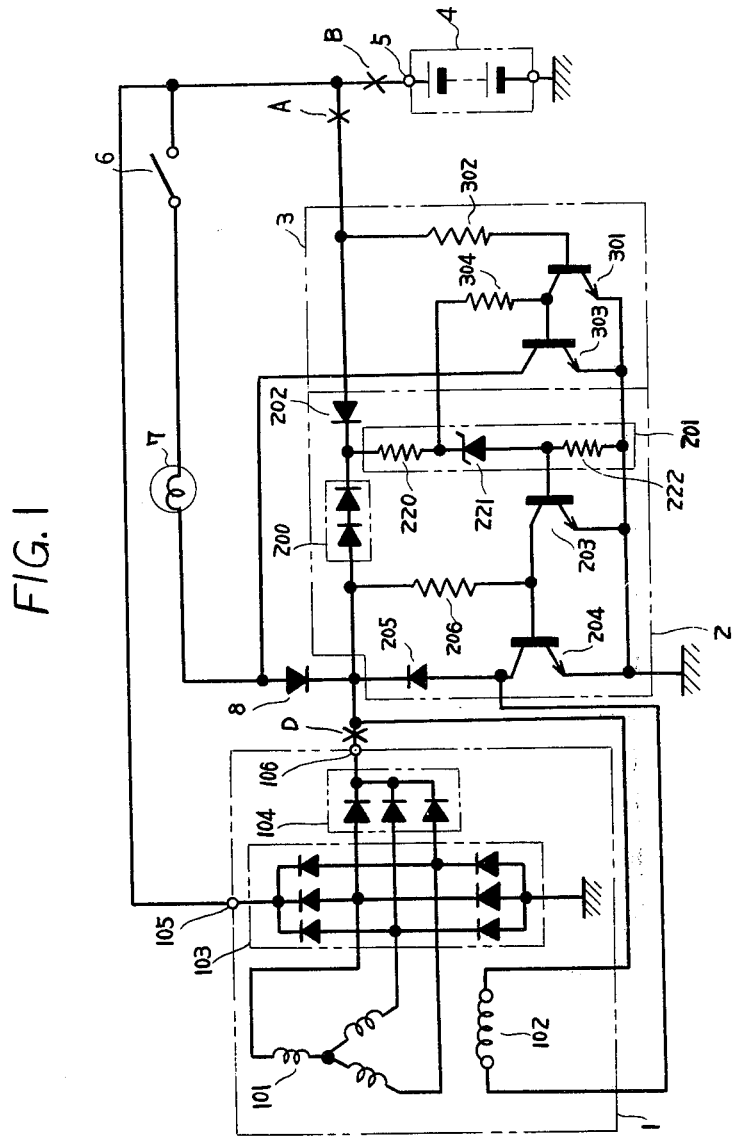

Referring now to FIG. 1 showing a first embodiment of the present invention, an alternating current generator generally used as a battery charging generator is designated by reference numeral 1, which has a three phase Y-connected generating winding 101 and a field winding 102, a full-wave bridge rectifier 103 connected to the generating winding 101 for rectifying its alternating current, and an auxiliary rectifier 104. Numerlas 105 and 106 respectively designate a positive terminal of the bridge rectifier 103 and the auxiliary rectifier 104. A voltage regulator 2 is connected to the positive terminal 106 for controlling output voltage of the generator 1, in which a voltage sensing circuit 201 consisting of voltage dividing resistors 220 and 222 and a zener diode 221 is connected to a positive terminal 5 of a battery 4 through a diode 202, a control transistor 203 is connected to the voltage sensing circuit 201 for being affected by voltage sensed therein, an output transistor 204 is connected to the control transistor 203 for controlling field current flowing through the field winding 102, a diode 205 is connected in parallel with the field winding for absorbing counter electromotive force appearing thereat, a resistor 206 is connected to a collector of the control transistor 203, and a compensating circuit 200 consisting of two diodes is connected between the voltage sensing circuit 201 and the positive terminal 106. The voltage drop of the compensating circuit 200 is larger than that of the diode 202. An abnormality discriminating circuit 3 is connected between the battery 4 and the voltage regulator 3, in which an input transistor 301 is connected to the positive terminal 5 of the battery through a resistor 302, an output transistor 303 is connected to the input transistor 301, and a resistor 304 is connected to a collector of the input transistor 301 at one end and to the voltage sensing circuit 201 at the other end. Numeral 6 designates a main key switch, 7 an indicating lamp, and 8 a diode. An anode of the diode 8 is connected to a collector of the output transistor 303 and a cathode thereof is connected to the voltage regulator 2. The positive terminal 105 of the bridge rectifier 103 is connected to the positive terminal 5 of the battery 4 through a power supply cable.

Now the operation of the first embodiment described above will now be explained. When the key switch 6 is closed, electric current from the battery 4 flows through the indicating lamp 7, the diode 8, the field winding 102 and the transistor 204 since a voltage sensed at the voltage sensing circuit 201 is not enough to make the control transistor 203 conductive, resulting in conduction of the output transistor 204. Therefore the field winding 102 will be energized from the battery 4 to provide initial excitation for the generator 1, and the lamp lights to indicate the sufficient excitation.

When the engine of the automotive vehicle starts to rotate and drives the generator 1, the output voltage thereof is generated and maintained at a desired level by the voltage regulator 2. Consequently, the lamp 7 is extinguished since the output voltage of the generator 1 becomes approximately equivalent to that of the battery 4. The voltage sensing circuit 201 senses the voltage supplied from the battery even though the voltage is supplied thereto from the positive terminal 106 of the auxiliary rectifier 104 through the compensating circuit 200. Because the voltage drop across the compensating circuit 200 is larger than that across the diode 202, the voltage from the battery 4 is higher than that from the terminal 106. As the output voltage of the generator 1 rises above a predetermined value which is defined by the resistors 220 and 222 and the zener diode 221 in the voltage sensing circuit 201, the control transistor 203 is made conductive and then the output transistor 204 is biased nonconductive, whereby the field current is switched off to reduce the output voltage of the generator 1. At this stage, the lamp 7 is kept extinguished since the generator 1 is still generating output voltage, though it makes a slow descent. And when the output voltage becomes less than the predetermined value, the control transistor 203 is made nonconductive to thereby bias the output transistor 204 conductive, whereby the field current begins again to flow through the field winding to increase the output voltage of the generator 1. Repeating the above operation controls the output voltage of the generator 1 at the predetermined value. Still more in the above operation, the abnormality discriminating circuit 3 gives no influence thereon, since the input transistor 301 is biased conductive by current from the battery, whereby the output transistor 303 in continuously made nonconductive.

However when the voltage regulator 2 becomes disconnected from the battery 4 at a point indicated by numeral A in FIG. 1, the base current of the input transistor 301 is cut off from the battery thereby to make the output transistor 303 conductive due to a base current thereof through the compensating circuit 200, the resistor 220 and the resistor 304 from the positive terminal 106 of the auxiliary rectifier 104. Accordingly the lamp 7 lights to indicate the disconnection to thereby inform the driver in the automotive vehicle of the disconnection. And further the voltage regulator 2 controls the output voltage of the generator 1, because the voltage sensing circuit 201 senses the voltage supplied from the positive terminal 106.

And when a disconnection occurs at a point B shown in FIG. 1, the output voltage of the generator 1 is controlled at the preset level defined by the compensation circuit 200 in combination with the voltage sensing circuit 201 as in the same manner described above. And further in this disconnection the electric current no longer flows through the lamp 7 from the battery 4, but flows from the positive terminal 105 therethrough, whereby the lamp 7 lights to indicate the disconnection.

When a disconnection occurs at a point D shown in FIG. 1, the field current to the field winding 102 does not flow from the positive terminal 106 but from the positive terminal 105 through the key switch 6, the indicating lamp 7, the diode 8, the field winding 102, and the output transistor 204, whereby the lamp 7 lights to indicate the disconnection.

Figure 2:
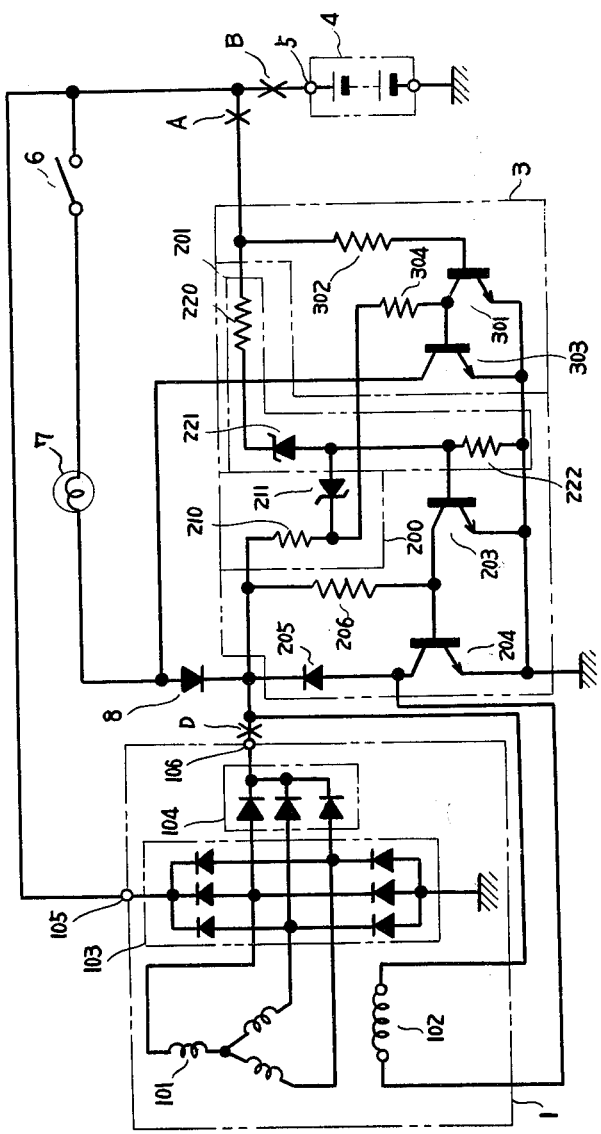

Referring next to FIG. 2 showing a second embodiment of the present invention, in which difference in comparison with the first embodiment in FIG. 1 resides in the voltage regulator. The voltage dropping circuit 200 includes a resistor 210 connected to the positive terminal 106 at one end thereof and to the voltage sensing circuit 201 through a zener diode 211 as well as to the collector of the input transistor 301 through the resistor 304 at the other end thereof.

The resistor 210, the zener diode 211 and the resistor 222 constitute another voltage sensing circuit sensing a voltage supplied from the positive terminal 106.

The operation of the second embodiment is almost the same as that of the first embodiment.

Figure 3:
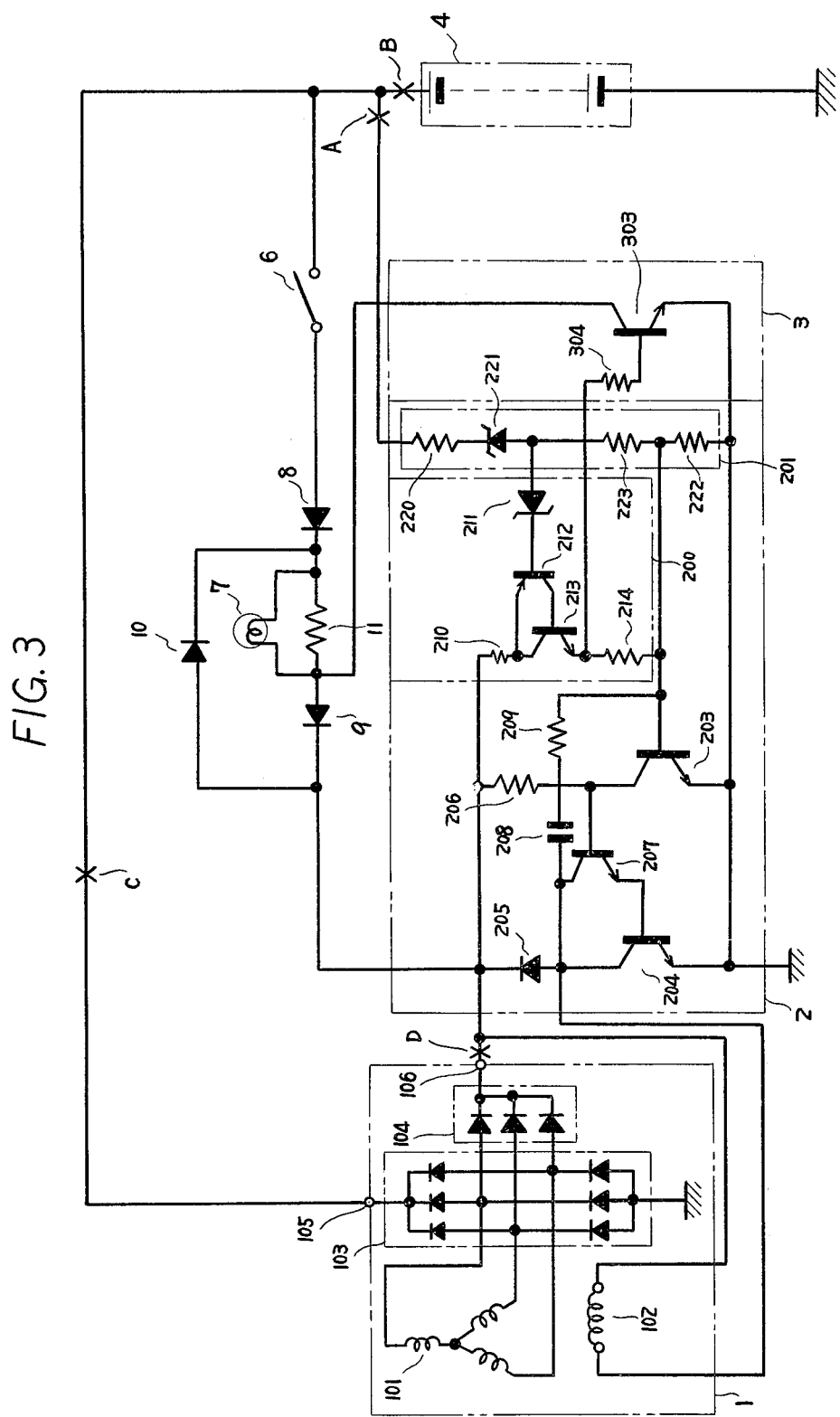

Referring to FIG. 3 showing a third embodiment of the present invention, numeral 200 designates a compensating circuit connected between the voltage sensing circuit 201 and the positive terminal 106 of the auxiliary rectifier 104, in which numeral 212 designates a PNP transistor whose base is connected to the zener diode 211, numeral 213 a NPN transistor, and 214 a resistor connected to the control transistor 303. This compensation circuit 200 provides another preset level in combination with the voltage sensing circuit 201 for controlling the output voltage of the generator 1, however since this another preset level is higher than that defined by the voltage sensing circuit 201, the voltage sensing circuit 201 serves to operate the voltage regulator 2 in normal operation and the compensation circuit 200 serves to operate the voltage regulator 2 in combination with the voltage sensing circuit 201 in abnormal condition such as a disconnection between the voltage sensing circuit and the battery 4. The operation in the abnormal condition will be described hereinafter in detail. Numeral 3 designates an abnormality discriminating circuit consisting of the output transistor 303 and the resistor 304 connected to the emitter of the NPN transistor 213. The collector of the output transistor 303 is connected to the indicating lamp 7. Numeral 207 is a transistor constituting a Darlington amplifier with the output transistor 204. Numerals 208 and 209 respectively designate a feedback capacitor and resistor connected between the collector of the transistor 207 and the base of the control transistor 203. Numerals 9 and 10 designate diodes, and 11 a resistor. And other components are the same as that in FIG. 1 or FIG. 2. Now the operation of the third embodiment will be described. When the key switch 6 is closed, electric current flows from the battery 4 through the diode 8, the parallel circuit of the indicating lamp 7 and the resistor 11, the diode 9, the field winding 102, and the output transistor 204 in the same manner explained in FIG. 1, and the lamp 7 lights to indicate the sufficient initial excitation in the field winding 102. In the normal operation, the compensation circuit 200 has no influence on the operation of the voltage regulator, then the zener diode 211 is not conductive, the transistor 212 and 213 are not conductive, and thereby, the output transistor 303 is not made conductive.

When a disconnection occurs between the voltage sensing circuit 201 and the battery 4, for example at a point A shown in FIG. 3, the voltage sensing circuit 201 can not sense the voltage because of no supply of voltage from the battery 4. On the contrary, the compensation circuit 200 and the resistors 222 and 223 of the voltage sensing circuit 201 sense the voltage supplied from the positive terminal 106 of the generator 1 in order to control the output voltage thereof. When the output voltage becomes higher than the preset level defined by the resistor 210, the PNP transistor 212, the zener diode 211, and the resistors 222 and 223, then zener diode 211 breaks to make the transistors 212 and 213 conductive. Upon conduction of the transistor 213 electric current from the generator 1 flows through the resistor 210, the transistor 213, the resistor 214 and to the base of the control transistor 203 to make it conductive, whereby the output transistor is driven into nonconduction. Accordingly, the field current is switched off to reduce the output voltage of the generator. And further by conduction of the transistor 213, the output transistor 303 of the abnormality discriminating circuit 3 is made conductive due to the base current thereof. Then the electric current flows through the key switch 6, the diode 8, the parallel circuit of the lamp 7 and the resistor 11, and the transistor 303, whereby the lamp 7 lights to indicate the disconnection. And when the output voltage of the generator 1 decreases to be less than the preset level defined by the compensation circuit 200 in combination with the voltage sensing circuit 201 as described before, the transistor 213 is made nonconductive to finally make the output transistor 204 conductive, whereby the output voltage of the generator 1 begins to rise again. Repeating these operation controls the output voltage at the preset level.

And when a disconnection occurs at a point B shown in FIG. 3, the output voltage of the generator 1 is controlled at the preset level defined by the compensation circuit 200 in combination with the voltage sensing circuit 201 in the same manner described above. The electric current no longer flows through the lamp 7, however, the electric current from the positive terminal 106 flows through the diode 10, the parallel circuit of the lamp 7 and the resistor 11, and the transistor 303, whereby the lamp 7 lights to indicate the disconnection.

When a disconnection occurs at a point C shown in FIG. 3, the voltage sensing circuit 201 senses that the battery voltage has not reached the predetermined value, even though the output voltage of the generator exceeds the predetermined value, due to no charge on the battery 4. However, the compensation circuit 200 senses the exceeded voltage and operates the voltage regulator in combination with the voltage sensing circuit 201, whereby the output voltage of the generator is controlled at the preset level defined by those circuits 201 and 200.

Furthermore the lamp 7 lights by the current from the battery 4 to indicate the disconnection as in the same manner described above.

And further, when a disconnection occurs at a point D shown in FIG. 3, the field current to the field winding 102 does not flow from the positive terminal 106 but from the positive terminal 105 through the key switch 6, the diode 8, the parallel circuit of the lamp 7 and the resistor 11, the diode 9, the field winding 102, and the output transistor 204, whereby the lamp 7 lights to indicate the disconnection.

Figure 4:
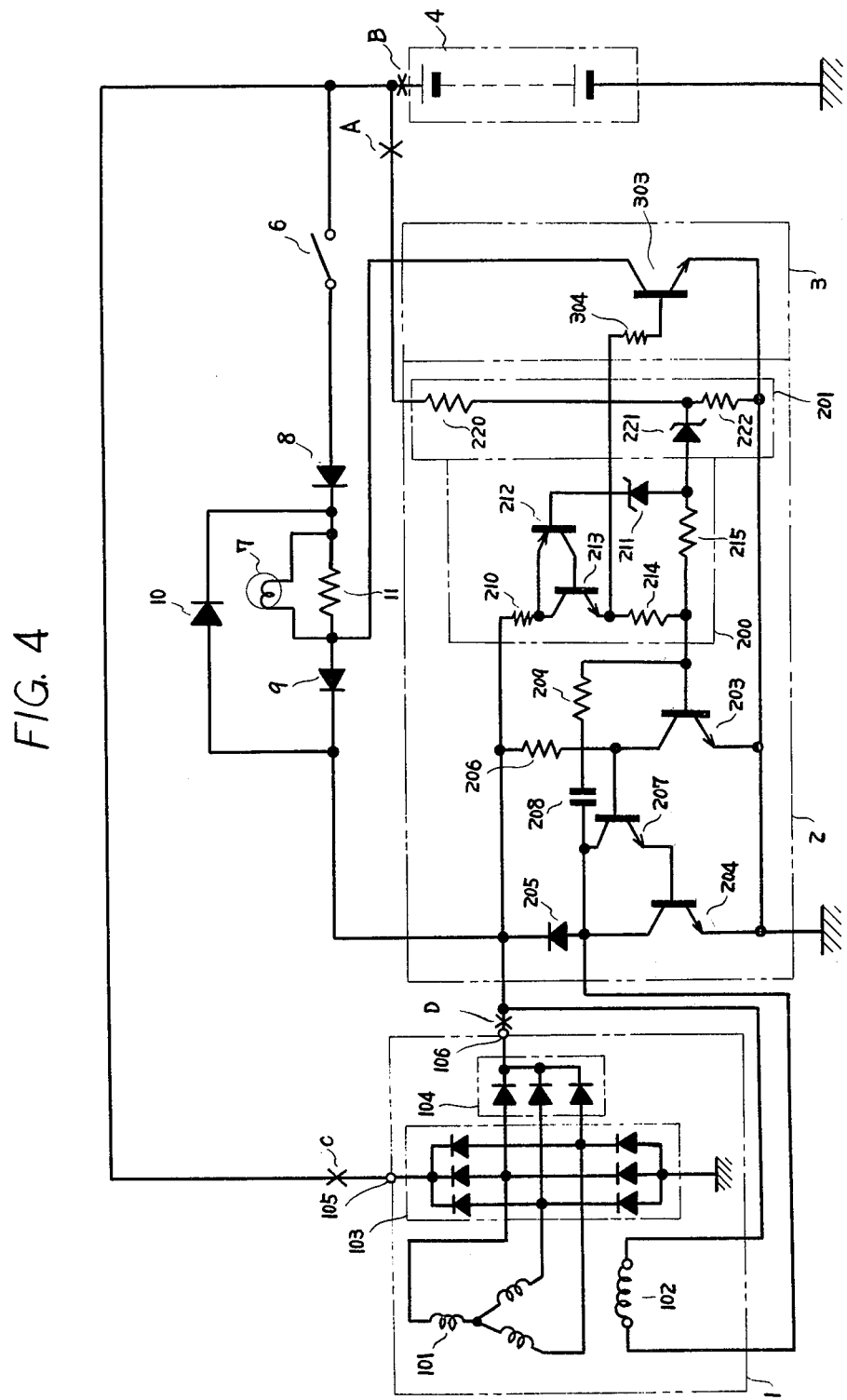

Referring next to FIG. 4 showing a fourth embodiment of the present invention, in which difference with regard to the third embodiment of FIG. 3 resides in the compensation circuit 200. The compensation circuit 200 comprises the resistor 210, the PNP transistor 212, the NPN transistor 213, the zener diode 211, the resistor 214 and a resistor 215.

The other components and the operation of the fourth embodiment are almost the same as that of the third embodiment, therefore, they are omitted.

Figure 5:
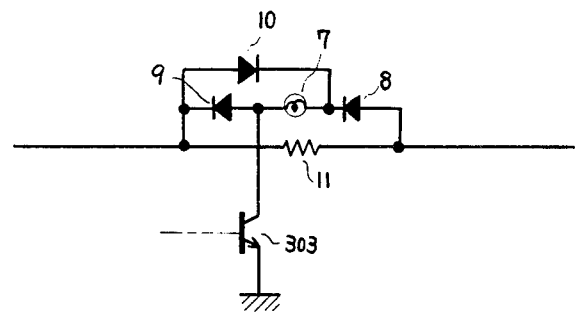

FIG. 5 shows a modified circuit around the indicating lamp which may be employed in FIGS. 3 and 4. According to this modification, the output transistor 303 of the abnormality discriminating circuit 3 can be designed smaller in its capacitance, since current flowing through the transistor 303 is smaller in comparison with that in FIG. 3 or FIG. 4, in other words the current is defined by current flowing through only the lamp 7 in FIG. 5 contrary to current flowing through the parallel circuit of the lamp 7 and the resistor 11 in FIG. 3 or FIG. 4.

Figure 6:
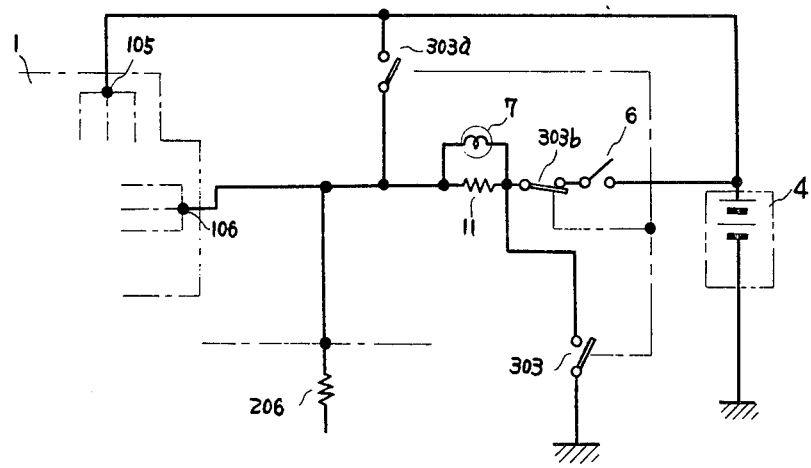

Referring to FIG. 6, the diodes 8, 9 and 10 of the preceding embodiments are replaced by switching means 303a and 303b and the output transistor 303 is also replaced by a switching means 303 such as a reed switch or a relay.

The switching means 303 and 303a are normally opened and the switching means 303b is normally closed. In addition, the switching means 57a and 57b and operable in response to the switching means 303', whereby the same operation described in FIG. 3 and 4 is obtained.

What we claim is:

1. A voltage regulating system for an automotive vehicle comprising:
   an alternating current generator having a generating winding and field winding;
   a first rectifier circuit connected to said generating winding;
   a second rectifier circuit connected to said generating winding for providing a positive field energizing terminal at its output, said field winding being connected at one of its ends to said terminal;
   a storage battery connected to the output of said first rectifier circuit through a supply cable;
   a field affecting transistor operatively related to said field winding for selectively completing a circuit from the terminal through said field winding;
   a voltage sensing circuit connected across said battery for detecting battery voltage;
   a base of said field affecting transistor being operatively related to said voltage sensing circuit, whereby said field affecting transistor is driven into nonconduction when the battery voltage exceeds a first predetermined level;
   a compensating circuit connected between said positive terminal and said voltage sensing circuit, said compensating circuit being operative to drive said field affecting transistor into nonconduction when (1) the battery voltage supplied to said voltage sensing circuit is insufficient for driving said field affecting transistor into nonconduction and (2) the voltage at said positive terminal exceeds a second predetermined level;
   an indicating lamp connected between said supply cable and said positive field energizing terminal; and
   a lamp energizing circuit including switching means for connecting said indicating lamp between said supply cable and ground when said switching means is conductive, said switching means being connected to said positive terminal through said compensating circuit, whereby when said compensating circuit is operative, said switching means is made conductive, thus energizing said indicating lamp.

2. A voltage regulating system for an automotive vehicle comprising;
   an alternating current generator having a generating winding and a field winding;
   a first rectifier circuit connected to said generating winding;

a second rectifier circuit connected to said generating winding for providing a positive field energizing terminal at its output, said field winding being connected at one of its ends to said terminal;

a storage battery connected to the output of said first rectifier circuit through a supply cable;

a field affecting transistor operatively related to said field winding for selectively completing a circuit from the terminal through said field winding;

a voltage sensing circuit connected across said battery for detecting battery voltage;

a base of said field affecting transistor being operatively related to said voltage sensing circuit, whereby said field affecting transistor is driven into nonconduction when the battery voltage exceeds a first predetermined level;

a compensating circuit including a PNP transistor electrically connected to said positive terminal at its emitter, and a zener diode connected between the base of said PNP transistor and said voltage sensing circuit, said compensating circuit being operative to drive said field affecting transistor into nonconduction when (1) the battery voltage supplied to said voltage sensing circuit is insufficient for driving said field affecting transistor into nonconduction and (2) the voltage at said positive terminal exceeds a second predetermined level;

an indicating lamp connected between said supply cable and said positive field energizing terminal; and a lamp energizing circuit including switching means for connecting said indicating lamp between said supply cable and ground when said switching means is conductive, said switching means being electrically connected to the collector of said PNP transistor whereby when said compensating circuit is operative, said indicating lamp is energized.

3. A voltage regulating system as set forth in claim 2 further comprising:

means for connecting said indicating lamp between said positive terminal and ground through said switching means.

4. A voltage regulating system for an automotive vehicle comprising;

an alternating current generator having a generating winding and a field winding;

a first rectifier circuit connected to said generating winding;

a second rectifier circuit connected to said generating winding for providing a positive field energizing terminal at its output, said field winding being connected at one of its ends to said terminal;

a storage battery connected to the output of said first rectifier circuit through a supply cable;

a field affecting transistor operatively related to said field winding for selectively completng a circuit from the terminal through said field winding;

a voltage sensing circuit connected across said battery for detecting battery voltage;

a base of said field affecting transistor being operatively related to said voltage sensing circuit, whereby said field affecting transistor is driven into nonconduction when the battery voltage exceeds a first predetermined level;

a compensating circuit connected between said positive terminal and said voltage sensing circuit, said compensating circuit being operative to drive said field affecting transistor into nonconduction when (1) the battery voltage supplied to said voltage sensing circuit is insufficient for driving said field affecting transistor into nonconduction and (2) the voltage at said positive terminal exceeds a second predetermined level;

an indicating lamp connected between said supply cable and said positive field energizing terminal; and a clamp energizing circuit including an output transistor and an input transistor wherein said output transistor has a collector-emitter path between said indicating lamp and ground and a base connected to said positive terminal through the compensating circuit, said base additionally being connected to a collector of the input transistor, and wherein said input transistor has a base electrically connected to the battery, whereby when said battery is disconnected from at least one of said supply cable and base of the input transistor, the output transistor is made conductive to energize said indicating lamp.

5. A voltage regulating system as set forth in claim 4, wherein said compensating circuit comprises a plurality of diodes.

6. A voltage regulating system as set forth in claim 4 wherein said compensating circuit comprises a zener diode.

* * * * *